(12) United States Patent
Kim

(10) Patent No.: US 7,854,795 B2
(45) Date of Patent: Dec. 21, 2010

(54) NON-ADHESIVE COATING COMPOSITION AND METHOD OF PREPARING THE SAME

(76) Inventor: Tae Woong Kim, 128-61, Sangbong-dong, Jungnang-gu, Seoul 131-220 (KR)

( * ) Notice: Subject to any disclaimer, the term of this patent is extended or adjusted under 35 U.S.C. 154(b) by 0 days.

(21) Appl. No.: 12/742,244

(22) PCT Filed: Jul. 22, 2009

(86) PCT No.: PCT/KR2009/004081

§ 371 (c)(1),
(2), (4) Date: May 10, 2010

(87) PCT Pub. No.: WO2010/044535

PCT Pub. Date: Apr. 22, 2010

(65) Prior Publication Data

US 2010/0242799 A1   Sep. 30, 2010

(30) Foreign Application Priority Data

Oct. 14, 2008   (KR) .................. 10-2008-0100458
Feb. 10, 2009   (KR) .................. 10-2009-0010574

(51) Int. Cl.
*C09D 1/00*   (2006.01)
*C09D 7/12*   (2006.01)

(52) U.S. Cl. .............. 106/2; 106/14.4; 106/14.44; 106/287.11; 106/287.13; 106/287.14; 106/287.17; 106/287.26; 106/287.34

(58) Field of Classification Search .............. 106/2, 106/14.14, 14.44, 287.1, 287.11, 287.13, 106/287.14, 287.17, 287.26, 287.34
See application file for complete search history.

(56) References Cited

U.S. PATENT DOCUMENTS

| | | | | |
|---|---|---|---|---|
| 6,645,612 B2 * | 11/2003 | Pujari et al. | ............... | 428/325 |
| 7,524,560 B2 * | 4/2009 | Paisner et al. | ............... | 428/403 |
| 7,527,859 B2 * | 5/2009 | Zhong et al. | ............... | 428/403 |
| 2006/0210818 A1 * | 9/2006 | Binkle et al. | ............... | 428/469 |

FOREIGN PATENT DOCUMENTS

| | | | |
|---|---|---|---|
| JP | 2-110196 A | * | 4/1990 |
| JP | 2003-339552 A | * | 12/2003 |
| WO | WO2009/056944 A2 | * | 5/2009 |

* cited by examiner

*Primary Examiner*—Anthony J Green
(74) *Attorney, Agent, or Firm*—John K. Park; Park Law Firm

(57) ABSTRACT

The present invention relates to a non-adhesive coating composition, including: 100 parts by weight of colloidal silica sol; 5~60 parts by weight of hexagonal boron nitride (hBN) serving as a filler; 60~120 parts by weight of alkoxysilane; 40~130 parts by weight of alcohol; and 0.5~3.0 parts by weight of a catalyst.

7 Claims, No Drawings

NON-ADHESIVE COATING COMPOSITION AND METHOD OF PREPARING THE SAME

TECHNICAL FIELD

The present invention relates to a non-adhesive coating composition and a method of preparing the same, and, more particularly, to a non-adhesive coating composition, which includes hexagonal boron nitride (hBN) having high lubricity and a binder for coating, and which forms an inorganic coating layer on the surface of a kitchen utensil made of aluminum, stainless steel or the like, thus improving the non-adhesivity, heat resistance, corrosion resistance and water resistance of the kitchen utensil and increasing the thermal conductivity of the kitchen utensil at the time of heating the kitchen utensil, and to a method of preparing the same.

BACKGROUND ART

Generally, a coating agent, which is used as an interior or exterior material of a kitchen utensil, requires excellent alkali resistance, acid resistance, wear resistance, durability, heat resistance and the like. Therefore, a fluorine resin or a silicon resin is used as a main component of the coating agent.

Here, the fluorine resin is a coating agent including polytetrafluoroethylene (PTFE), which is well known for its use in Teflon coating, as a main component. Referring to conventional technologies related to this fluorine resin, Korean Patent Registration No. 10-0099134 discloses a fluoro resin coating composition used in flow coating, comprising a blend of PTFE and a perfluorovinyl ether copolymer, an acrylate resin, and a nonionic surfactant.

When a kitchen utensil is coated with this fluorine resin, there are advantages in that the durability, corrosion resistance and the like of the kitchen utensil are improved, and food does not adhere to the kitchen utensil (that is, the kitchen utensil has non-adhesivity), but there is a problem in that, when the kitchen utensil coated with the fluorine resin is heated, volatile organic compounds (VOC), particularly perfluorooctanoate (PFOA), are generated from PTFE, and thus the generated VOCs injure a human's health when they are introduced into the human body. Further, a heat-resistant coating agent including a silicon resin is also problematic in that heat resistance cannot be exhibited at a temperature of more than 300° C., and in that the kitchen utensil coated with this coating agent is easily worn and discolored because the coating agent has low hardness.

In order to solve the above problems, Korean Utility Model Registration No. 20-0403258 discloses a ceramic glass frying pan coated with ceramic on which a ceramic coating layer is formed to improve heat resistance and durability. However, even in this case, there is also a problem in that the non-stick property of the ceramic coating layer is much lower than PTFE. Therefore, in order to solve this problem, a method of increasing non-adhesivity by mixing fluorosilane, silicon oil or the like in a top coating layer has been attempted, but this method is also problematic in that the performance of the top coating layer rapidly deteriorates because the material mixed in the top coating layer is pyrolyzed at a temperature of 260° C. or more at the time of heating, and in that the non-adhesivity of the top coating layer is easily lost because the durability and heat resistance of the top coating layer is decreased.

Therefore, the present inventors have made many attempts to solve the above problems occurring in the prior art. As one attempt, they mixed hexagonal boron nitride (hBN) and a binder for coating, coated a kitchen utensil with the mixture, and then cured the kitchen utensil. As a result, they developed a coating composition having excellent properties, which does not generate harmful gases at the time of heating, which can maintain material properties such as corrosion resistance, heat resistance, durability and the like for a long period of time because it has high hardness, and which can exhibit non-adhesivity even at a high temperature of 400° C. or more. Based on the development of the coating composition, the present invention was completed.

DISCLOSURE

Technical Problem

Accordingly, the present invention has been made keeping in mind the above problems occurring in the prior art, and an object of the present invention is to provide a non-adhesive coating composition, which includes hexagonal boron nitride (hBN) and a binder including silica sol and alkoxysilane, and with which a kitchen utensil is coated and cured, so that the mechanical properties of the kitchen utensil, such as corrosion resistance, heat resistance, durability and the like, can be maintained for a long period of time because it has high hardness, and the non-adhesivity of the kitchen utensil can be exhibited even at a high temperature of 400° C. or more, with the result that it is possible to prevent foreign substances from adhering to the kitchen utensil and to prevent cooking oil from spattering from the kitchen utensil and getting stuck on the kitchen utensil during frying, and to provide a method of preparing the same.

In particular, hexagonal boron nitride (hBN), which is used as a filler in the present invention, has excellent lubricity and mechanical properties, does not decompose at a temperature of 2100° C. or lower in a nitrogen atmosphere, and has high thermal conductivity.

Technical Solution

In order to accomplish the above object, an aspect of the present invention provides a non-adhesive coating composition, including: 100 parts by weight of colloidal silica sol; 5~60 parts by weight of hexagonal boron nitride (hBN) serving as a filler; 60~120 parts by weight of alkoxysilane; 40~130 parts by weight of alcohol; and 0.5~3.0 parts by weight of a catalyst.

In the non-adhesive coating composition, the colloidal silica sol may be formed by mixing 20~40 wt % of silica having a particle size of 10~50 nm with 60~80 wt % of water, and the filler may be formed by mixing hexagonal boron nitride (hBN) with one or more selected from among metal oxides, such as $Al_2O_3$, $ZrO_2$, $SiO$, and $MnO_2$, and nonoxides, such as $SiC$, $Si_3N_4$, and $B_4C$.

Further, in the non-adhesive coating composition, the alcohol may be one selected from among methyl alcohol, ethyl alcohol, and isopropyl alcohol, and the alkoxysilane may be one or more selected from among methyltrimethoxysilane [$CH_3Si(CH_3O)_3$], tetramethoxysilane [$Si(CH_3O)_4$], trimethylethoxysilane [$(CH_3)_3Si(C_2H_5O)$], tetraethoxysilane [$Si(C_2H_5O)_4$].

Another aspect of the present invention provides a method of preparing a non-adhesive coating composition, including the steps of: 1) mixing hexagonal boron nitride (hBN) serving as a filler with alcohol to form a first mixture and then pulverizing the first mixture for 2~10 hours to a size of 0.5~10 μm; 2) adding silica sol and a catalyst to the first mixture pulverized in step 1) to form a second mixture and then stirring the second mixture at a rotational speed of 40~50 rpm for 5~10 minutes; and 3) adding alkoxysilane to the second mixture stirred in step 2) to form a third mixture and then stirring the third mixture at a temperature of 20~30° C. for 2~15 hours to age the third mixture.

Advantageous Effects

As described above, the non-adhesive coating composition according to the present invention is advantageous in that, since it includes hexagonal boron nitride (hBN) having excellent lubricity and a binder including silica sol, alkoxysilane and the like and is applied on the surface of a kitchen utensil and then cured, it does not generate harmful gases at the time of heating, can maintain material properties such as corrosion resistance, heat resistance, durability and the like for a long period of time because it has high hardness, and can exhibit non-adhesivity even at a high temperature of 400° C. or more and thus the kitchen utensil does not wear and discolor even when it is used for a long period of time, and in that cooking oil does not spatter from the kitchen utensil or adhere on the kitchen utensil during frying, and energy consumption can be reduced because it has high thermal conductivity. Further, the non-adhesive coating composition according to the present invention is advantageous in that, since it includes hexagonal boron nitride (hBN) as a filler, when it is applied on a kitchen utensil, it prevents dust from adhering to the kitchen utensil, and in that, when an ultraviolet (UV) screening agent is added to the coating composition, it can be used as a coating agent for interior and exterior materials of buildings or a coating agent for automobiles because it has excellent water repellency.

BEST MODE

Hereinafter, a non-adhesive coating composition of the present invention will be described in detail.

The present invention provides a non-adhesive coating composition, including: 100 parts by weight of colloidal silica sol; 5~60 parts by weight of hexagonal boron nitride (hBN) serving as a filler; 60~120 parts by weight of alkoxysilane; 40~130 parts by weight of alcohol; and 0.5~3.0 parts by weight of a catalyst.

In the present invention, the silica sol serves to improve the mechanical properties such as durability, wear resistance and the like and the chemical properties such as corrosion resistance and the like of a coating layer. It is preferred that the amount of silica sol be 100 parts by weight. When the amount of silica sol is less than 100 parts by weight, the material properties of a coating layer can worsen. In contrast, when the amount thereof is more than 100 parts by weight, the material properties of the coating layer are improved, but only slightly.

Meanwhile, the silica sol may be prepared by mixing 20 ~40 wt % of silica having a particle size of 10~50 nm with 60~80 wt % of water, but, if necessary, the mixing ratio of silica to water may be suitably adjusted.

The hexagonal boron nitride (hBN), which is used as a filler in the present invention, serves to prevent cooking oil from spattering from the kitchen utensil or to prevent food from adhering to the kitchen utensil at the time of cooking because it has excellent lubricity. It is preferred that the amount of hexagonal boron nitride (hBN) be 5~60 parts by weight, more preferably 20~40 parts by weight, based on 100 parts by weight of silica sol. When the amount of hexagonal boron nitride (hBN) is less than 5 parts by weight, it is problematic in that food adheres to a kitchen utensil or cooking oil spatters from the kitchen utensil at the time of cooking because its amount is excessively small. In contrast, when the amount thereof is more than 60 wt %, it is advantageous in that it is possible to prevent cooking oil from spattering from the kitchen utensil or to prevent food from adhering to the kitchen utensil at the time of cooking because it has excellent lubricity, but it is also problematic that the lifespan of a coating layer may be decreased because of the shortage of other components.

Further, the hexagonal boron nitride (hBN) powder may have a particle size of 0.5~10 μm, but, if necessary, its particle size may be suitably adjusted.

Furthermore, the hexagonal boron nitride (hBN) may be independently used as the filler, but, if necessary, may be mixed with one or more selected from among metal oxides and nonoxides. It is preferred that the mixing ratio of hexagonal boron nitride (hBN) to a metal oxide, a nonoxide or a mixture thereof be 40~60:60~40, more preferably 50:50.

Here, the metal oxide may be one or more selected from among $Al_2O_3$, $ZrO_2$, $SiO_2$, and $MnO_2$, and the nonoxide may be one or more selected from among SiC, $Si_3N_4$, and $B_4C$.

Meanwhile, the hexagonal boron nitride (hBN), which is used in the present invention, is formed into white powder by heating it to a temperature of 2,000° C. or more in a graphite reactor, an thus removing oxygen, hydrogen and carbon therefrom and then substituting it with nitrogen at a temperature of 1950~2150° C., and is characterized in that it has excellent lubricity, corrosion resistance, heat resistance, insulation properties and the like, and in that it does not decompose at a temperature of 2100° C. or lower in a nitrogen atmosphere.

Generally, boron nitrides (BN) are known to include four kinds of boron nitrides, such as cubic boron nitride (cBN), wurtzite boron nitride (wBN), rhombohedral boron nitride (rBN) and hexagonal boron nitride (hBN). In the present invention, among them, the hexagonal boron nitride (hBN), which can exhibit more excellent non-adhesivity than polytetrafluoroethylene (PTFE) when it is used to prepare a coating composition for a kitchen utensil, is used as a binder of silica sol and alkoxysilane to prepare the coating composition. Therefore, when this coating composition is applied on a kitchen utensil, the kitchen utensil coated with the coating composition is advantageous in that it does not wear and discolor even when it is used for a long period of time, in that it can prevent cooking oil from spattering from the kitchen utensil or prevent food from adhering to the kitchen utensil at the time of cooking, in that it is harmless to the human body because harmful gases and substances are not generated therefrom, and in that fuel consumption can be reduced because it has high thermal conductivity at the time of cooking.

In the present invention, the alkoxysilane serves to chemically bond inorganic binders through a chemical reaction. It is preferred that the amount of alkoxysilane be 60~120 parts by weight based on 100 parts by weight of silica sol. When the amount of alkoxysilane is less than 60 parts by weight, the bonding force between the inorganic binders can be decreased because its amount is excessively small. In contrast, when the amount thereof is more than 120 parts by weight, a coating layer can peel off at high temperature because it is used excessively compared to other added binders.

Meanwhile, the alkoxysilane may be one or more selected from among methyltrimethoxysilane [$CH_3Si(CH_3O)_3$], tetramethoxysilane [$Si(CH_3O)_4$], trimethylethoxysilane [$(CH_3)_3Si(C_2H_5O)$], tetraethoxysilane [$Si(C_2H_5O)_4$].

In the present invention, the alcohol serves as a solvent for mixing an inorganic filler. It is preferred that the amount of alcohol be 40~130 parts by weight based on 100 parts by weight of silica sol. When the amount of alcohol is less than 40 parts by weight, the inorganic filler cannot be sufficiently mixed because its amount is excessively small. In contrast, when the amount thereof is more than 130 parts by weight, the inorganic filler can be sufficiently mixed because it is excessively used, but its effect is slight compared to its amount.

The alcohol used in the present invention may be one selected from among methyl alcohol, ethyl alcohol, and isopropyl alcohol, but, if necessary, may not be limited thereto as long as it has an effect equal to or more than that of one selected from among them.

In the present invention, the catalyst serves to improve the aging ability and storage capability of a coating composition. It is preferred that the amount of the catalyst be 0.5~3.0 parts by weight based on 100 parts by weight of silica sol. When the amount of the catalyst is less than 0.5 parts by weight, aging time can be increased because its amount is excessively small. In contrast, when the amount thereof is more than 3.0 parts by weight, the time for stably using the coating composition can be rapidly shortened.

The catalyst used in the present invention may be one selected from among nitric acid, hydrochloric acid, formic acid and acetic acid, but, if necessary, may not be limited thereto as long as it has an effect equal to or more than that of one selected from among them.

The non-adhesive coating composition of the present invention may further include 1~30 part by weight of a pigment based on 100 parts by weight of silica sol. When the amount of the pigment is less than 1 part by weight, the color of a coating layer is not vivid. In contrast, when the amount thereof is more than 30 parts by weight, the color of a coating layer becomes excessively bright.

The pigment used in the coating composition may be one or more selected from among titanium dioxide ($TiO_2$), ferric oxide ($Fe_2O_3$), chromium oxide ($Cr_2O_3$), carbon (C) and cobalt (Co), but, if necessary, may not be limited thereto as long as it has material properties equal to or more than those of one selected from among them.

Further, if necessary, the non-adhesive coating composition of the present invention may further include 1~5 part by weight of a dispersant such as methyl polysiloxane, silver nano sol, alumina sol, zirconia sol or the like in order to increase the strength of a coating layer and improve the material properties of a coating agent.

Meanwhile, the silver nano sol, alumina sol or zirconia sol may be prepared by mixing 5~20 wt % of silver powder, alumina powder or zirconia powder having a particle size of 10~50 nm with 80~95 wt % of water, but, if necessary, the mixing ratio thereof may be suitably adjusted.

When the above coating composition of the present invention is applied on a kitchen utensil, the kitchen utensil coated with the coating composition is advantageous in that it does not wear and discolor even when it is used for a long period of time, in that it can prevent cooking oil from spattering from the kitchen utensil or prevent food from adhering to the kitchen utensil at the time of cooking, in that it is harmless to the human body because harmful gases and substances are not generated therefrom, and in that energy consumption can be reduced because it has high thermal conductivity at the time of cooking.

Further, the coating composition of the present invention, including hexagonal boron nitride (hBN) as a filler, is advantageous in that, when it is applied on a kitchen utensil, it prevents dust from adhering to the kitchen utensil, and in that, when an ultraviolet (UV) screening agent is added to the coating composition, it can be used as a coating agent for interior and exterior materials of buildings or a coating agent for automobiles because it has excellent water repellency.

Hereinafter, a method of preparing the non-adhesive coating composition according to the present invention will be described in detail as follows.

The method of preparing the non-adhesive coating composition includes the steps of: 1) mixing an inorganic filler including hexagonal boron nitride (hBN) with alcohol to form a first mixture and then pulverizing the first mixture for 2~10 hours; 2) adding silica sol and a catalyst to the first mixture pulverized in step 1) to form a second mixture and then stirring the second mixture at a rotational speed of 40~50 rpm for 5~10 minutes; and 3) adding alkoxysilane to the second mixture stirred in step 2) to form a third mixture and then stirring the third mixture at a temperature of 20~30° C. for 2~15 hours to age the third mixture.

Hereinafter, the method of preparing the non-adhesive coating composition according to the present invention will be described in detail by steps.

In step 1), an inorganic filler including hexagonal boron nitride (hBN) is mixed with alcohol, and is then pulverized to have a size of 0.5~10 μm using a pulverizer such as a ball mill. When the inorganic filler pulverized in this way is added to the coating composition and then the coating composition is applied on the surface of a kitchen utensil, it is possible to prevent food from adhering to the kitchen utensil at the time of cooking due to the high lubricity thereof and to prevent dust from adhering thereto. Since the mixing ratio of the inorganic filler and alcohol was previously described, the detailed description thereof will be omitted.

In step 2), silica sol and a catalyst are added to the first mixture pulverized in step 1) to form a second mixture, and the second mixture is stirred at a rotational speed of 40~50 rpm for 5~10 minutes. When the rotational speed is less than 40 rpm or the stirring time is less then 5 minutes, the additives cannot be sufficiently mixed. In contrast, when the rotational speed is more than 50 rpm or the stirring time is more then 10 minutes, the additives can be sufficiently mixed, but its further effect is slight. Since the amounts of the silica sol and catalyst were previously described, the detailed description thereof will be omitted.

Further, in step 2), if necessary, 1~5 part by weight of a dispersant such as methyl polysiloxane, silver nano sol, alumina sol, zirconia sol or the like may be further selectively added to the non-adhesive coating composition of the present invention at the time of mixing the silica sol and catalyst.

In step 3), alkoxysilane is added to the second mixture stirred in step 2) to form a third mixture, and then the third mixture is stirred at a temperature of 20 ~30° C. for 2~15 hours to age the third mixture. When the stirring temperature is lower than 20° C. or the stirring time is less than 2 hours, the third mixture is not sufficiently stirred, so that a polycondensation reaction is insufficiently conducted, thereby decreasing the bonding force of a coating layer. In contrast, when the stirring temperature is higher than 30° C. or the stirring time is more than 15 hours, the third mixture is sufficiently stirred, but the bonding force thereof may also be decreased because the polycondensation reaction is excessively conducted. Since the amount of the alkoxysilane was previously described, the detailed description thereof will be omitted.

Meanwhile, a method of forming a coating layer on a kitchen utensil using the non-adhesive coating composition prepared by the above method includes: sand-blasting the pre-treated substrate using emery (100~120#) to form protrusions and recesses; spraying the non-adhesive coating composition on the sand-blasted substrate using a spray gun to form a coating layer having a thickness of 20~40 μm thereon; and sintering the coating layer at a temperature of 200±5° C. for 30±2 minutes.

Hereinafter, the present invention will be described in more detail with reference to the following Examples. Here, the following Examples are set forth to illustrate the present invention, and the scope of the present invention is not limited thereto.

1. Preparation of Non-Adhesive Coating Composition and Test Sample Thereof

EXAMPLE 1

First, based on 100 parts by weight of silica sol, 60 parts by weight of hexagonal boron nitride (hBN) was mixed with 130 parts by weight of isopropyl alcohol to form a first mixture, and then the mixture was ball-milled for 6 hours to be pulverized in a size of 0.5~10 μm. Subsequently, 100 parts by weight of silica sol and 0.5 parts by weight of formic acid were added to the first mixture and then stirred for 7 minutes to form a second mixture. Then, 120 parts by weight of methyltrimethoxysilane was added to the second mixture to form a third mixture, and then the third mixture was stirred and aged at a temperature of 27° C. for 8 hours to prepare a coating composition. The prepared coating composition was sprayed on the surface of an aluminum frying pan, which was sand-blasted using emery (100~120#) to form protrusions and recesses, using a spray gun to form a coating layer having a thickness of 30 μm. Subsequently, the coating layer was sintered at a temperature of 200° C. for 30 minutes.

EXAMPLE 2

Based on 100 parts by weight of silica sol, 5 parts by weight of hexagonal boron nitride (hBN) was mixed with 40 parts by weight of isopropyl alcohol to form a first mixture, and then the mixture was ball-milled for 6 hours to be pulverized in a size of 0.5~10 μm. Subsequently, 100 parts by weight of silica sol and 3 parts by weight of formic acid were added to the first mixture and then stirred for 7 minutes to form a second mixture. Then, 90 parts by weight of methyltrimethoxysilane was added to the second mixture to form a third mixture, and then the third mixture was stirred and aged at a temperature of 27° C. for 8 hours to prepare a coating composition. An aluminum frying pan was coated with the prepared coating composition using the same method as in Example 1.

EXAMPLE 3

Based on 100 parts by weight of silica sol, 30 parts by weight of hexagonal boron nitride (hBN) was mixed with 90 parts by weight of isopropyl alcohol to form a first mixture, and then the mixture was ball-milled for 6 hours to be pulverized in a size of 0.5~10 μm. Subsequently, 100 parts by weight of silica sol and 2 parts by weight of formic acid were added to the first mixture and then stirred for 7 minutes to form a second mixture. Then, 60 parts by weight of methyltrimethoxysilane was added to the second mixture to form a third mixture, and then the third mixture was stirred and aged at a temperature of 27° C. for 8 hours to prepare a coating composition. An aluminum frying pan was coated with the prepared coating composition using the same method as in Example 1.

In Examples 1 to 3, the silica sol was prepared by mixing 30 wt % of silica having a particle size of 10~50 nm with 70 wt % of water.

COMPARATIVE EXAMPLE 1

Based on 100 parts by weight of silica sol, 70 parts by weight of hexagonal boron nitride (hBN) was mixed with 150 parts by weight of isopropyl alcohol to form a first mixture, and then the mixture was ball-milled for 6 hours to be pulverized in a size of 0.5~10 μm. Subsequently, 100 parts by weight of silica sol and 0.5 parts by weight of formic acid were added to the first mixture and then stirred for 7 minutes to form a second mixture. Then, 120 parts by weight of methyltrimethoxysilane was added to the second mixture to form a third mixture, and then the third mixture was stirred and aged at a temperature of 27° C. for 8 hours to prepare a coating composition. An aluminum frying pan was coated with the prepared coating composition using the same method as in Example 1.

COMPARATIVE EXAMPLE 2

Based on 100 parts by weight of silica sol, 3 parts by weight of hexagonal boron nitride (hBN) was mixed with 50 parts by weight of isopropyl alcohol to form a first mixture, and then the mixture was ball-milled for 6 hours to be pulverized in a size of 0.5~10 μm. Subsequently, 100 parts by weight of silica sol and 3 parts by weight of formic acid were added to the first mixture and then stirred for 7 minutes to form a second mixture. Then, 60 parts by weight of methyltrimethoxysilane was added to the second mixture to form a third mixture, and then the third mixture was stirred and aged at a temperature of 27° C. for 8 hours to prepare a coating composition. An aluminum frying pan was coated with the prepared coating composition using the same method as in Example 1.

COMPARATIVE EXAMPLE 3

100 parts by weight of silica sol, 70 parts by weight of isopropyl alcohol and 2 parts by weight of formic acid were added and then stirred for 7 minutes to form a first mixture. Then, 100 parts by weight methyltrimethoxysilane was added to the first mixture to form a second mixture, and then the second mixture was stirred and aged at a temperature of 27° C. for 8 hours to prepare a coating composition. An aluminum frying pan was coated with the prepared coating composition using the same method as in Example 1.

2. Measuring Method

1) A film strength test was conducted according to "a pencil hardness resistance test of a coating film" prescribed in 5.9 of KS D 8303 (a measuring method of an anodized composite coating film of aluminum and aluminum alloy).

2) A corrosion resistance test was conducted according to "a corrosion resistance test of an anodized coating film" prescribed in 5.7 of KS D 8303 (a measuring method of an anodized composite coating film of aluminum and aluminum alloy).

3) A water resistance test was conducted by cutting a coated aluminum plate to a size of 100×100 mm, measuring the weight of the cut aluminum plate, leaving the cut aluminum plate in ion-exchange water for 3 hours and then measuring the change in the weight of the aluminum plate and the swelling phenomenon of the external appearance of the aluminum plate. In this case, when both the weight change and the swelling phenomenon did not occur, it was represented by ⊚, when the weight change slightly occurred, it was represented by ○, when both the weight change and the swelling phenomenon slightly occurred, it was represented by Δ, and when both the weight change and the swelling phenomenon greatly occurred, it was represented by x.

4) A non-adhesivity test was conducted by measuring the degree to which eggs adhered to a coated frying pan while the eggs were fried on the coated frying pan three times at each of 170° C., 190° C., 210° C., 230° C., 250° C. and 270° C. In this case, when the degree was very good, it was represented by ⊚, when the degree was good, it was represented by ○, when the degree was average, it was represented by Δ, and when the degree was poor, it was represented by x.

3. Measuring Results and Evaluation

The film strength, corrosion resistance and water resistance of the coating composition applied to the frying pan were measured using the above method, and the results thereof are shown in Table 1. Further, the non-adhesivity thereof was measured using the above method, and the results thereof are shown in Table 2.

TABLE 1

| | | Measured items | | |
|---|---|---|---|---|
| Class. | | Film strength | Corrosion resistance | Water resistance |
| Examples | 1 | 9H | RN 9.8 | ⊚ |
| | 2 | 9H | RN 9.8 | ⊚ |
| | 3 | 9H | RN 9.8 | ⊚ |
| Comparative Examples | 1 | 7H | 9-1 | Δ |
| | 2 | 7H | 9-1 | Δ |
| | 3 | 6H | 8-4 | X |

As shown in Table 1, when each of the coating compositions of Examples 1 to 3 was applied on the frying pan, a coating film was densely formed on the frying pan. The strength of the coating film was measured seven times by scratching the coating film with a pencil lead in a state in which the pencil lead was inclined at an angle of 45 degrees to the surface of the coating film. As a result, it was found that the coating film did not rupture even when the pencil lead had a hardness of 9H. However, it was found that the coated films formed by applying the coating composition of Comparative Examples 1 and 2 on the frying pan ruptured when the pencil lead had a hardness of 7H, and that the coated film formed by applying the coating composition of Comparative Example 3 on the frying pan ruptured when the pencil lead had a hardness of 6H.

In the corrosion resistance test, when the temperature of a test bath reached 50° C., a saline solution was sprayed onto a coated frying pan at regular periods for 54 hours while maintaining an air pressure for compressing the saline solution at a pressure of 98±10 KPa, and then the corrosion state of the coated frying pan was observed by the naked eye. As a result, indistinct traces partially appeared in the test samples of Examples 1 to 3, whereas distinct spots, which can be observed by the naked eye, appeared in the test samples of Comparative Examples 1 to 3.

In the water resistance test, a coated aluminum plate was cut to a size of 100×100 mm, the weight of the cut aluminum plate was measured, the cut aluminum plate was left in ion-exchange water for 3 hours, and then the change in the weight of the aluminum plate and the swelling phenomenon of the external appearance of the aluminum plate were measured. As a result, the weight change and peeling phenomena did not occur in the test samples of Examples 1 to 3, whereas weight change and cracks slightly occurred in the test samples of Comparative Examples 1 and 2, and cracks or crumples, which can be clearly observed by the naked eye, appeared in the test sample of Comparative Example 3 because the coating composition of Comparative Example 3 did not include hexagonal boron nitride.

TABLE 2

| Class. | 170° C. | 190° C. | 210° C. | 230° C. | 250° C. | 270° C. |
|---|---|---|---|---|---|---|
| Example 1 | ⊚ | ⊚ | ⊚ | ⊚ | ⊚ | ⊚ |
| Example 2 | ⊚ | ⊚ | ⊚ | ⊚ | ⊚ | ⊚ |
| Example 3 | ⊚ | ⊚ | ⊚ | ⊚ | ⊚ | ⊚ |
| Comp. Example 1 | ○ | ○ | ○ | Δ | Δ | X |
| Comp. Example 2 | ○ | ○ | ○ | Δ | X | X |
| Comp. Example 3 | Δ | Δ | Δ | X | X | X |

As shown in Table 2, it was found that the non-adhesivity of each of the coating compositions including hexagonal boron nitride at a predetermined ratio of Examples 1 to 3 is very good because cooking oil did not spatter from the kitchen utensil or adhere to a frying pan at the time of frying an egg. However, it was found that, in the coating compositions of Comparative Examples 1 and 2, cooking oil adhered to the frying pan according to the increase in temperature of the frying pan because the coating compositions of Comparative Examples 1 and 2 include hexagonal boron nitride excessively or insufficiently, and that, in the coating composition of Comparative Example 3, cooking oil more greatly spattered from the kitchen utensil or adhered to the frying pan according to the increase in temperature of the frying pan because the coating composition of Comparative Example 3 does not include hexagonal boron nitride.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

A non-adhesive coating composition is prepared through the steps of: 1) mixing an inorganic filler including hexagonal boron nitride (hBN) with alcohol to form a first mixture and then pulverizing the first mixture for 2~10 hours; 2) adding silica sol and a catalyst to the first mixture pulverized in step 1) to form a second mixture and then stirring the second mixture at a rotational speed of 40~50 rpm for 5~10 minutes; and 3) adding alkoxysilane to the second mixture stirred in step 2) to form a third mixture and then stirring the third mixture at a temperature of 20~30° C. for 2~15 hours to age the third mixture.

The invention claimed is:

1. A non-adhesive coating composition, comprising:
   100 parts by weight of silica sol which is formed by mixing 20~40 wt % of silica having a particle size of 10~50 nm with 60~80 wt % of water;
   5~60 parts by weight of a filler in which hexagonal boron nitride (hBN) is mixed with a metal oxide, a nonoxide or a mixture thereof in a mixing ratio of 40~60:40~60 wt %;
   60~120 parts by weight of alkoxysilane;
   40~130 parts by weight of methyl alcohol or isopropyl alcohol; and
   5~3.0 parts by weight of a catalyst,
   wherein the metal oxide is $Al_2O_3$ or $ZrO_2$, and the nonoxide is $Si_3N_4$ or $B_4C$.

2. The non-adhesive coating composition according to claim 1, wherein the alkoxysilane is one or more selected from among methyltrimethoxysilane [$CH_3Si(CH_3O)_3$], tetramethoxysilane [Si(CH$_3$O)$_4$], trimethylethoxysilane [(CH$_3$)$_3$ Si (C$_2$H$_5$O)], tetraethoxysilane [Si (C$_2$H$_5$O)$_4$].

3. The non-adhesive coating composition according to claim 2, further comprising: 1~30 parts by weight of a pigment.

4. The non-adhesive coating composition according to claim 1, further comprising: 1~30 parts by weight of a pigment.

5. The non-adhesive coating composition according to claim 4, wherein the pigment is one or more selected from among titanium dioxide (TiO$_2$), ferric oxide (Fe$_2$O$_3$), chromium oxide (Cr$_2$O$_3$), carbon (C), and cobalt (Co).

6. The non-adhesive coating composition according to claim 3, wherein the pigment is one or more selected from among titanium dioxide (TiO$_2$), ferric oxide (Fe$_2$O$_3$), chromium oxide (Cr$_2$O$_3$), carbon (C), and cobalt (Co).

7. A method of preparing a non-adhesive coating composition, comprising the steps of:

1) mixing a filler in which hexagonal boron nitride (hBN) is mixed with a metal oxide, a nonoxide or a mixture thereof in a mixing ratio of 40~60:40~60 wt % with methyl alcohol or isopropyl alcohol to form a first mixture and then pulverizing the first mixture for 2~10 hours;

2) adding silica sol which is formed by mixing 20~40 wt % of silica having a particle size of 10~50 nm with 60~80 wt % of water and a catalyst to the first mixture pulverized in step 1) to form a second mixture and then stirring the second mixture at a rotational speed of 40~50 rpm for 5~10 minutes; and 3) adding alkoxysilane to the second mixture stirred in step 2) to form a third mixture and then stirring the third mixture at a temperature of 20~30° C. for 2~15 hours to age the third mixture, wherein the metal oxide is Al$_2$O$_3$ or ZrO$_2$, and the nonoxide is Si$_3$N$_4$ or B$_4$C.

* * * * *